(12) United States Patent
van de Waerdt et al.

(10) Patent No.: US 8,239,631 B2
(45) Date of Patent: Aug. 7, 2012

(54) SYSTEM AND METHOD FOR REPLACING DATA IN A CACHE

(75) Inventors: Jan-Willem van de Waerdt, San Jose, CA (US); Johan Gerard Willem Maria Janssen, San Jose, CA (US); Maurice Penners, Mountain View, CA (US)

(73) Assignee: Entropic Communications, Inc., San Diego, CA (US)

( * ) Notice: Subject to any disclaimer, the term of this patent is extended or adjusted under 35 U.S.C. 154(b) by 381 days.

(21) Appl. No.: 12/429,908

(22) Filed: Apr. 24, 2009

(65) Prior Publication Data

US 2010/0274974 A1 Oct. 28, 2010

(51) Int. Cl.
*G06F 12/00* (2006.01)

(52) U.S. Cl. .................. 711/136; 711/160; 711/E12.071

(58) Field of Classification Search ............ 711/136, 711/160, E12.071
See application file for complete search history.

(56) References Cited

U.S. PATENT DOCUMENTS 5,584,013 A * 12/1996 Cheong et al. ............... 711/122
2003/0221069 A1* 11/2003 Azevedo et al. ............. 711/136
* cited by examiner

*Primary Examiner* — Kevin Verbrugge
*Assistant Examiner* — Victor Wang
(74) *Attorney, Agent, or Firm* — Duane Morris LLP

(57) ABSTRACT

A system and method for replacing data in a cache utilizes cache block validity information, which contains information that indicates that data in a cache block is no longer needed for processing, to maintain least recently used information of cache blocks in a cache set of the cache, identifies the least recently used cache block of the cache set using the least recently used information of the cache blocks in the cache set, and replaces data in the least recently used cache block of the cache set with data from main memory.

20 Claims, 7 Drawing Sheets

INITIAL ORDER OF TIME IN TERMS OF USAGE OF EIGHT CACHE BLOCKS IN A CACHE

0 LRU 1 LRU 2 LRU 3 LRU 4 LRU 5 LRU 6 LRU 7

THE INITIAL ORDER OF TIME REPRESENTED BY THE FULL LRU CACHE REPLACEMENT SCHEME OF FIG. 4

0 LRU 1 LRU 2 LRU 3 LRU 4 LRU 5 LRU 6 LRU 7

THE INITIAL ORDER OF TIME REPRESENTED BY A TRADITIONAL TWO-LEVEL HIERARCHICAL LRU CACHE REPLACEMENT SCHEME

{0 LRU 1} LRU {2 LRU 3} LRU {4 LRU 5} LRU {6 LRU 7}

THE INITIAL ORDER OF TIME REPRESENTED BY THE CACHE REPLACEMENT SCHEME DESCRIBED WITH REFERENCE TO FIG. 3

{0 LRU 1} LRU {2 LRU 3} LRU {4 LRU 5} LRU {6 LRU 7}

FIG. 5

UPDATED ORDER OF TIME IN TERMS OF USAGE OF THE EIGHT CACHE BLOCKS IN

1 LRU 2 LRU 3 LRU 4 LRU 5 LRU 6 LRU 7 LRU 0

THE UPDATED ORDER OF TIME REPRESENTED BY THE FULL LRU CACHE REPLACEMENT SCHEME OF FIG. 4

1 LRU 2 LRU 3 LRU 4 LRU 5 LRU 6 LRU 7 LRU 0

THE UPDATED ORDER OF TIME REPRESENTED BY A TRADITIONAL TWO-LEVEL HIERARCHICAL LRU CACHE REPLACEMENT SCHEME

{2 LRU 3} LRU {4 LRU 5} LRU {6 LRU 7} LRU {1 LRU 0}

THE UPDATED ORDER OF TIME REPRESENTED BY THE CACHE REPLACEMENT SCHEME DESCRIBED WITH REFERENCE TO FIG. 3

{1 LRU 0} LRU {2 LRU 3} LRU {4 LRU 5} LRU {6 LRU 7}

FIG. 6

SYSTEM AND METHOD FOR REPLACING DATA IN A CACHE

Embodiments of the invention relate generally to cache management systems and methods and, more particularly, to a system and method for replacing data in a cache.

BACKGROUND OF THE INVENTION

Cache is used to reduce average access time of data elements for processing. Cache is typically organized into cache sets, where each cache set includes multiple cache blocks. Each cache block contains multiple data elements. Because a cache contains a subset of data elements in main memory, the cache can be made smaller than the main memory and allows faster access than the main memory. Data elements that are not contained in the cache need to be retrieved from the main memory. Retrieving new data elements from the main memory into the cache typically requires replacing existing data elements in cache blocks.

Least recently used (LRU) cache replacement schemes, which are based on the assumption that data elements in the LRU cache block of a cache set will be the least likely to be used in the near future and are therefore the best candidates for replacement in the cache set, provide an order of time in terms of usage of cache blocks in a cache set. Full LRU cache replacement schemes provide a perfect order in time in terms of usage of cache blocks in a cache set. However, implementations of full LRU cache replacement schemes require a large amount of bits for representing the perfect order in time. Hierarchical LRU cache replacement schemes are introduced to provide a near perfect order in time in terms of usage of cache blocks in a cache set. Compared to the implementations of full LRU cache replacement schemes, implementations of hierarchical LRU cache replacement schemes require fewer bits for representing the near perfect order.

A concern with such hierarchical LRU cache replacement schemes is the imperfect order in time. Because of the imperfect order in time, a cache block that is not the LRU cache block in a cache set may be mistakenly identified as the LRU cache block in the cache set. As a result, the performance of hierarchical LRU cache replacement schemes is impacted.

BRIEF SUMMARY OF THE INVENTION

A system and method for replacing data in a cache utilizes cache block validity information to maintain least recently used information of cache blocks in a cache set of the cache, identifies the least recently used cache block of the cache set using the least recently used information of the cache blocks in the cache set, and replaces data in the least recently used cache block of the cache set with data from main memory.

In an embodiment, a method for replacing data in a cache includes maintaining least recently used information of cache blocks in a cache set of the cache using cache block validity information, identifying the least recently used cache block of the cache set using the least recently used information of the cache blocks in the cache set and replacing data in the least recently used cache block of the cache set with data from main memory.

In an embodiment, a video processing system includes main memory, a cache, a video processor and a cache management unit. The main memory is configured to store a data working set. The cache is coupled to the main memory and configured to cache a subset of the data working set. The video processor is coupled to the cache and configured to process the subset of the data working set. The cache management unit is configured to maintain least recently used information of cache blocks in a cache set of the cache using cache block validity information, identify the least recently used cache block of the cache set using the least recently used information of the cache blocks in the cache set, and replace data in the least recently used cache block of the cache set with data from the data working set stored at the main memory.

In an embodiment, a method for replacing data in a cache in a video processing system includes dividing cache blocks in a cache set of the cache in the video processing system into cache block groups, where each of the cache block groups includes multiple cache blocks, maintaining least recently used information of the cache blocks in the cache set using cache block validity information, identifying the least recently used cache block of the cache set using the least recently used information of the cache blocks in the cache set and replacing data in the least recently used cache block of the cache set with data from main memory in the video processing system.

Other aspects and advantages of embodiments of the present invention will become apparent from the following detailed description, taken in conjunction with the accompanying drawings, depicted by way of example of the principles of the invention.

BRIEF DESCRIPTION OF THE SEVERAL VIEWS OF THE DRAWINGS

FIG. 5 illustrates an initial order of time in terms of usage of eight cache blocks in a cache set of the cache of FIG. 2.

FIG. 6 illustrates an updated order of time in terms of usage of the eight cache blocks in the cache set of the cache of FIG. 2.

DETAILED DESCRIPTION OF THE INVENTION

Figure 1:
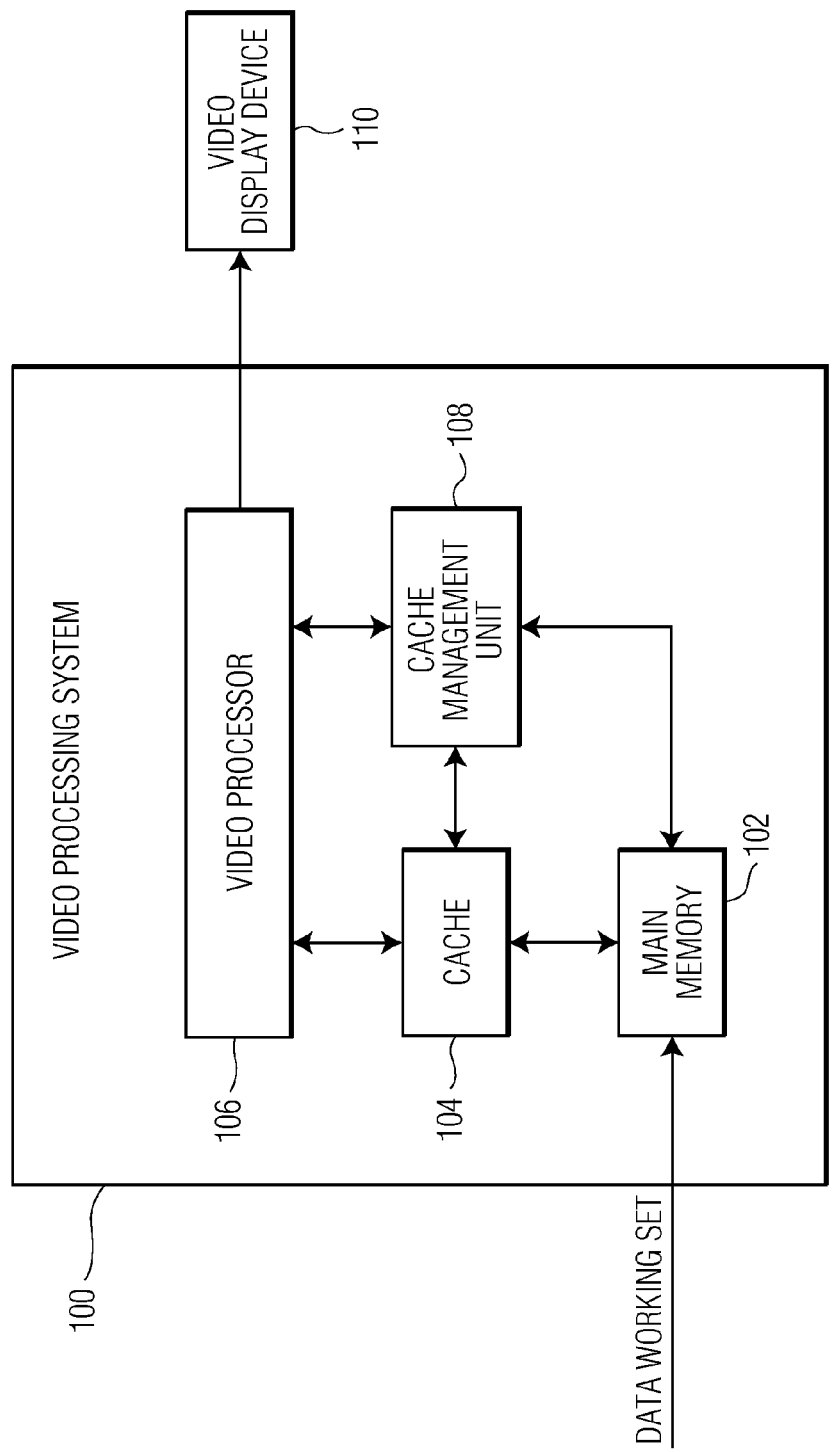
FIG. 1 is a schematic block diagram of a video processing system in accordance with an embodiment of the invention.

FIG. 1 is a schematic block diagram of a video processing system 100 in accordance with an embodiment of the invention. The system of FIG. 1 can be used to improve cache replacement performance in hierarchical LRU cache replacement schemes. The system of FIG. 1 may be used for motion adaptive picture processing that involves cache replacing.

As shown in FIG. 1, the video processing system 100 includes main memory 102, a cache 104, a video processor 106, and a cache management unit 108. These modules of the video processing system may be implemented in software, hardware, firmware, or a combination of software, hardware, and firmware. The video processing system may be connected to a video display device 110, such as a television set or a computer monitor.

Although the video processing system 100 of FIG. 1 includes a single main memory 102, a single cache 104, a single video processor 106, and a single cache management unit 108, the video processing system may include multiple memories, cache units, video processors, or cache management units. For example, the video processing system may include one first level cache (not shown) and one second level cache (not shown) in which a subset of data in the main memory is cached in the second level cache and a subset of data in the second level cache is cached in the first level cache.

Although the modules of the video processing system 100 of FIG. 1 are shown as being separate components, some or all of the modules may be integrated into fewer components in other embodiments. For example, the cache management unit 108 may be part of the cache 104 and/or the video processor 106.

In the embodiment of FIG. 1, the main memory 102 is connected to the video processor 106 through the cache 104 and is configured to store a data working set, which includes multiple data elements. The main memory may be directly connected to the video processor.

As shown in FIG. 1, the cache 104 is connected to the main memory 102, the video processor 106, and the cache management unit 108. The cache is organized in cache sets, where each cache set includes multiple cache blocks, also referred to as ways. Each cache block contains multiple data elements. The way associativity indicates the number of cache blocks in a cache set. For example, in an 8-way associative cache, each cache set has eight cache blocks, also referred to as eight ways. The cache is configured to contain a subset of the data working set stored in the main memory. The subset of the data working set in the cache is located in a certain address range of the main memory. An example of the cache is described below with reference to FIG. 2.

The video processor 106 of FIG. 1 is connected to the cache 104 and the cache management unit 108. The video processor is configured to process the subset of the data working set in the cache and/or the working set in the main memory 102. The video processor may be a system on chip (SoC) processor for motion adaptive picture processing.

Because the cache 104 contains only a subset of data elements in the main memory 102, the cache management unit 108 of FIG. 1 retrieves data elements that are not contained in the cache from the main memory. In particular, the cache management unit replaces data in the cache with data from the main memory on a cache set basis. The cache management unit uses an LRU cache replacement scheme, which is based on the assumption that data in the LRU cache block of a cache set will be the least likely to be used by the video processor 106 in the near future and is therefore the best candidate for replacement in the cache set, to provide an order of time in terms of usage of cache blocks in the cache set. Each cache set contains LRU information to determine an order of the cache blocks in the cache set. When a replaced cache block contains updated or dirty data that is not reflected in the main memory, the cache management unit copies the data in the replaced cache block back to the main memory.

The cache management unit 108 of FIG. 1 is configured to maintain LRU information of cache blocks in a cache set using cache block validity information. The cache block validity information indicates whether a cache block is occupied by data from the main memory 102. In an embodiment, the cache block validity information also indicates whether a cache block is needed by the video processor 106 for video processing. If a cache block is occupied by data from the main memory, the cache block is referred to as being valid. If a cache block is not occupied or if data in the cache block is no longer needed by the video processor for video processing, the cache block is referred to as being invalid. In an embodiment, the cache management unit uses explicit "INVALIDATE" operations to invalidate a cache block if data in the cache block is no longer needed by the video processor for video processing.

In some embodiments, the cache management unit divides cache blocks in a cache set of the cache 104 into hierarchical levels of cache blocks, where each of the hierarchical levels of cache blocks includes multiple cache block sections. The cache management unit will update an order in time in terms of usage of two cache block sections in a high hierarchical level when data in a cache block of the two cache block sections is used for processing, if the cache block validity information indicates that data in all of the cache blocks in the two cache block sections is needed for processing. However, the cache management unit will keep an order in time in terms of usage of two cache block sections in a high hierarchical level the same if the cache block validity information indicates that data in at least one of the cache blocks in the two cache block sections is no longer needed for processing.

The cache management unit 108 is also configured to identify the LRU cache block of the cache set using the LRU information of the cache blocks in the cache set. Additionally, the cache management unit is configured to replace data in the LRU cache block of the cache set with data from the data working set stored at the main memory 102. An example of the operation of the cache management unit is described below with reference to FIG. 3.

Figure 2:
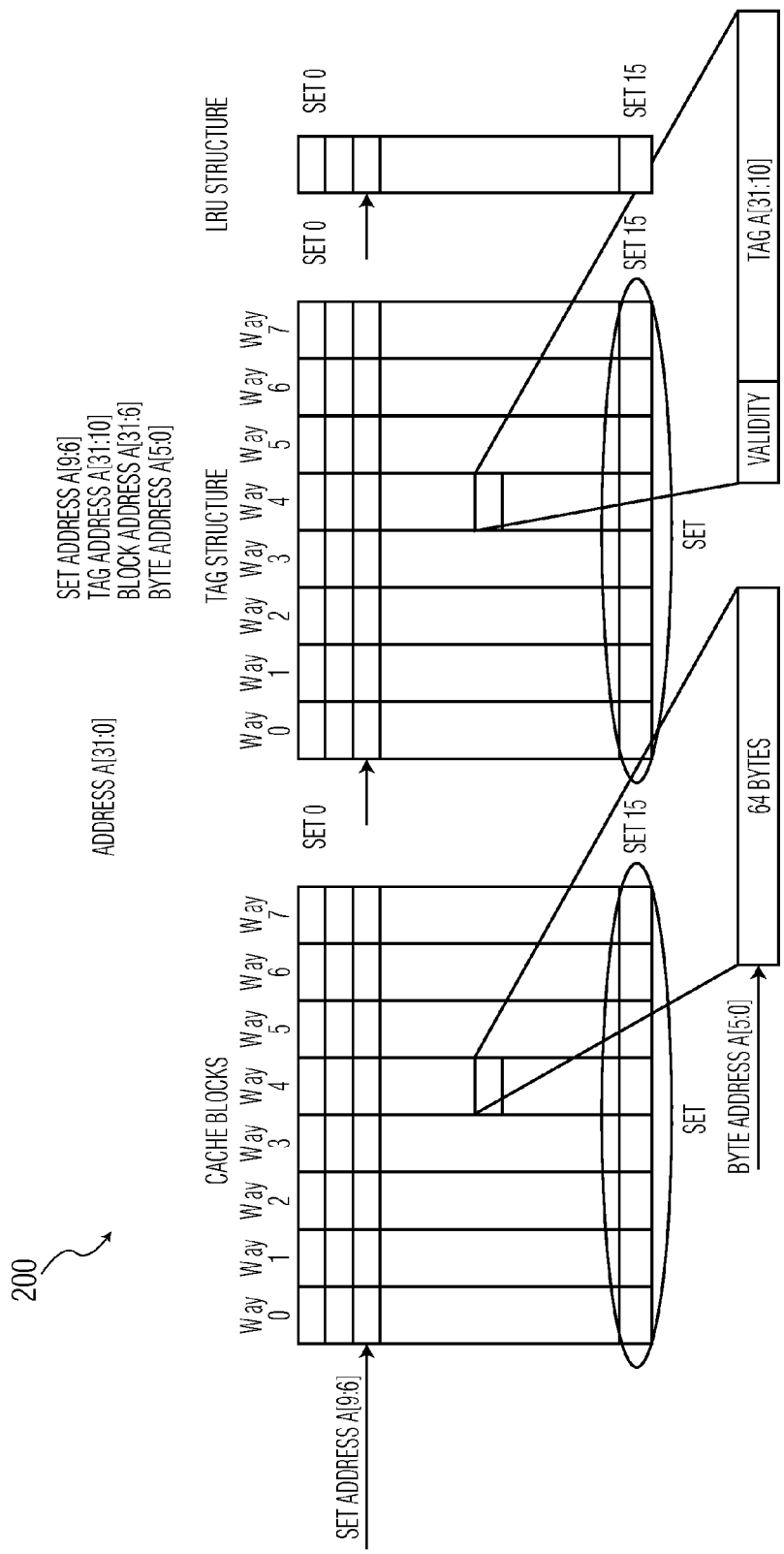
FIG. 2 depicts an example of the cache of FIG. 1.

FIG. 2 depicts an example of the cache 104 of FIG. 1. As shown on the left side of FIG. 2, an 8-way associative cache 200 with an eight kilobyte capacity includes sixteen cache sets, denoted as set "0" to set "15." Each of the sixteen cache sets includes eight cache blocks, also referred to as eight ways, denoted as way "0" to way "7." Each of the eight cache blocks in a cache set contains sixty-four bytes of data elements.

In the embodiment of FIG. 2, the cache 200 is configured to maintain information indicating where data elements in the cache blocks are located in the main memory 102. The main memory has a 32-bit address, denoted as "A[31:0]." The cache maps a cache block location to a corresponding location in the main memory that stores the same data as the cache block location. For example, the address of a sixty-four byte cache block in the 32-bit main memory can be identified as "A[31:6]." The address of a byte within a cache block is identified as "A[5:0]." The address of a cache set is identified as "A[9:6]."

As shown in the middle of FIG. 2, the cache 200 also contains a cache tag structure to store a tag address, e.g., "A[31:10]," which is used to determine where a cache block is located in the main memory 102. Besides the tag address, the cache tag structure also stores a validity bit for each cache block. The validity bit of a cache block indicates whether the cache block is occupied by data from the main memory. The validity bit of a cache block also indicates whether data in the cache block is needed by the video processor 106 for video processing. If a cache block is occupied by data from the main memory, the cache block is referred to as being valid, the validity bit of the cache block is set to a predetermined value, such as one, by the cache management unit 108 and the cache tag structure indicates the location of data in the cache block in the main memory. If a cache block is not occupied or if data in the cache block is no longer needed by the video processor for video processing, the cache block is referred to as being invalid and the validity bit of the cache block is set to another predetermined value, such as zero, by the cache management unit. Explicit "INVALIDATE" operations are used by the cache management unit to invalidate a cache block if data in the cache block is no longer needed by the video processor for video processing. At the start-up of the video processing system 100 of FIG. 1, the cache does not contain data from the main memory and all of the validity bits of the cache blocks are zero. In an alternative embodiment, the cache management unit sets the validity bit of a valid cache block to zero and the validity bit of an invalid cache block to one. Although FIG. 2 shows a single validity bit for each cache block, a cache block may include more than one validity bit to indicate whether or not a cache block is occupied by data from the main memory and whether or not data in the cache block is needed by the video processor for video processing.

As shown on the right side of FIG. 2, tag addresses and validity bits in the cache tag structure are used to construct an LRU information structure for each of the sixteen cache sets, denoted as set "0" to set "15."

Figure 3:
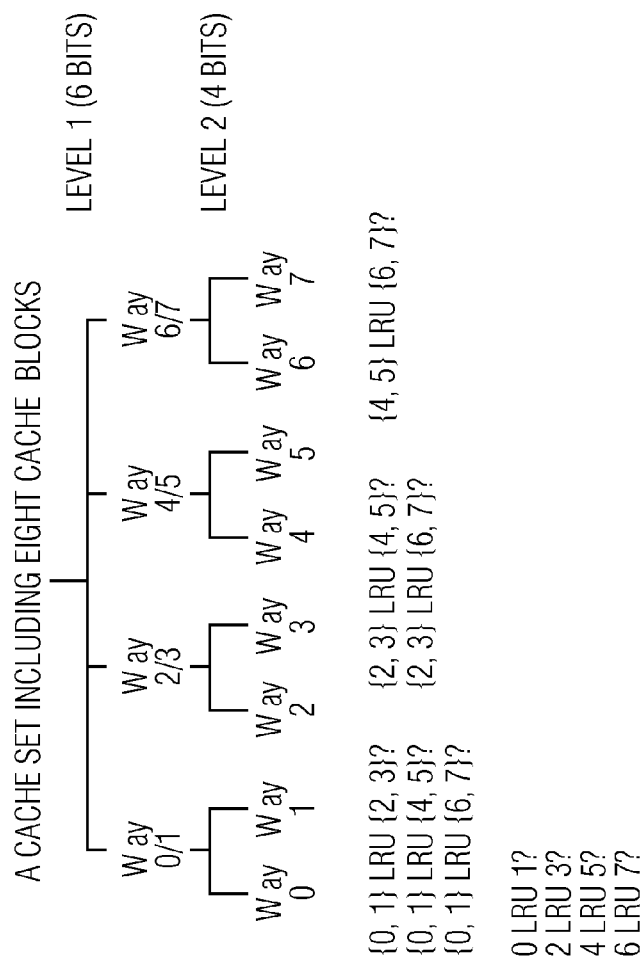
FIG. 3 depicts an example of the operation of the cache management unit of FIG. 1.

FIG. 3 depicts an example of the operation of the cache management unit 108 of FIG. 1. The cache management unit provides an order of time in terms of usage of cache blocks in each cache set of the cache 104. The example of FIG. 3 is described with reference to the 8-way associative cache 200 of FIG. 2.

Because the memory access pattern of video processing devices is typically predictable, cache contents inside cache blocks of a cache set are also predictable. This predictability makes it possible for the cache management unit 108 to explicitly manage the contents of the cache. For example, the cache management unit may know that data in certain cache blocks is no longer needed by the video processor 106 for video processing and may use this information to perform explicit "INVALIDATE" operations to invalidate a cache block if data in the cache block is no longer needed by the video processor for video processing. Specifically, the cache management unit may set the validity bit of the cache block in the tag structure to zero. When a cache block is invalidated by an "INVALIDATE" operation, the cache management unit frees up the cache block in the cache set. When the invalidated cache block contains updated or dirty data, the cache management unit copies the data in the cache block back to the main memory 102.

As shown in FIG. 3, the cache management unit 108 provides a two-level cache block hierarchy for a cache set of the 8-way associative cache 200 of FIG. 2. The cache set of the 8-way associative cache includes eight ways, also referred to as eight cache blocks, denoted as way "0," way "1," way "2," way "3," way "4," way "5," way "6," and way "7." The cache management unit groups the eight ways or cache blocks into four pairs of ways, also referred to as four pairs of cache blocks, denoted as pair "{0, 1}," pair "{2, 3}," pair "{4, 5}" and pair "{6, 7}." The first level involves the four pairs of ways and the second level involves two ways in each of the four pairs of ways. When data in a cache block is used by the video processor 106, the cache management unit makes the cache block the most recently used (MRU) cache block in the cache set.

At the first level of the cache blocks in the cache set, the cache management unit 108 maintains an order in time in terms of usage of the four pairs of cache blocks using the validity bit information stored in the validity bits of the cache blocks. If the validity bits indicate that none of the cache blocks in two pairs of cache blocks are invalid, then the cache management unit will update an order in time in terms of usage of the two pairs of cache blocks in the cache set when data in a cache block of the two pairs of cache blocks is used for video processing. Specifically, the cache management unit compares the time of last usage of one pair of the four pairs of cache blocks with the time of last usage of another pair of the four pairs of cache blocks. If the validity bits indicate that at least one of the cache blocks in two pairs of cache blocks is invalid, then the cache management unit will keep the order in time in terms of usage of the two pairs of cache blocks the same.

For example, the cache management unit 108 updates an order in time in terms of usage of the pair of cache blocks "{0, 1}" and the pair of cache blocks "{2, 3}" when data of cache blocks "0," "1," "2," or "3" is used by the video processor 106, if the validity bits indicates that none of the cache blocks "0," "1," "2," and "3" is invalid. The cache management unit will keep the order in time in terms of usage of the pair of cache blocks "{0, 1}" and the pair of cache blocks "{2, 3}" the same if the validity bits indicate that at least one of cache blocks "0," "1," "2," and "3" is invalid. If the pair of cache blocks "{0, 1}" is the LRU pair amongst the two pairs of cache blocks "{0, 1}" and "{2, 3}," when data in cache block "0" is used by the video processor and if the validity bits indicate that none of the cache blocks "0," "1," "2," and "3" are invalid, then the cache management unit will make the pair of cache blocks "{0, 1}" the MRU pair amongst the two pairs of cache blocks "{0, 1}" and "{2, 3}" and will make the pair of cache blocks "{2, 3}" the LRU pair amongst the two pairs of cache blocks "{0, 1}" and "{2, 3}." A bit is used to store the result of each comparison such that a characterization of the first level of the cache blocks requires four bits.

At the second level of the cache blocks in the cache set, the cache management unit 108 maintains an order in time in terms of usage of the two cache blocks in each of the four pairs of cache blocks. When data in a cache block is used by the video processor 106, the cache management unit makes the cache block the MRU cache block. The cache management unit updates an order in time in terms of usage of a pair of cache blocks in the cache set when data in a cache block of the two pairs of cache blocks is used by the video processor. Specifically, the cache management unit compares the time of last usage of a cache block in a pair of cache blocks with the time of last usage of the other block in the pair of cache blocks.

For example, the cache management unit 108 updates an order in time in terms of usage of cache block "0" and cache block "1" of the pair of cache blocks "{0, 1}" when data in cache block "0" or data in cache block "1" is used by the video processor 106. If cache block "0" is the LRU cache block of the pair of cache blocks "{0, 1}," when data in cache block "0" is used by the video processor, then the cache management unit will make cache block "0" the MRU cache block of the pair of cache blocks "{0, 1}" and will make cache block "1" the LRU cache block of the pair of cache blocks "{0, 1}." A bit is used to store the result of each comparison such that a characterization of the second level requires six bits. Using the above-described technique, a characterization of the two levels of cache blocks in the cache set requires ten bits.

Although the cache management unit 108 divides cache blocks of a cache set into four pairs of cache blocks in the example of FIG. 3, the cache management unit may divide cache blocks of a cache set into more than four groups of cache blocks or less than four groups of cache blocks.

Although each of the four pairs of cache blocks contains two cache blocks in the example of FIG. 3, the cache management unit 108 may divide cache blocks of a cache set into cache block groups, where each cache block group contains more than two cache blocks.

A full LRU cache replacement scheme may be used to provide a perfect order in time in terms of usage of eight cache blocks in each cache set for the 8-way associative cache 200 of FIG. 2. However, compared to the amount of bits required by the cache management unit 108 in the example of FIG. 3, an implementation of a full LRU cache replacement scheme requires more bits.

Figure 4:
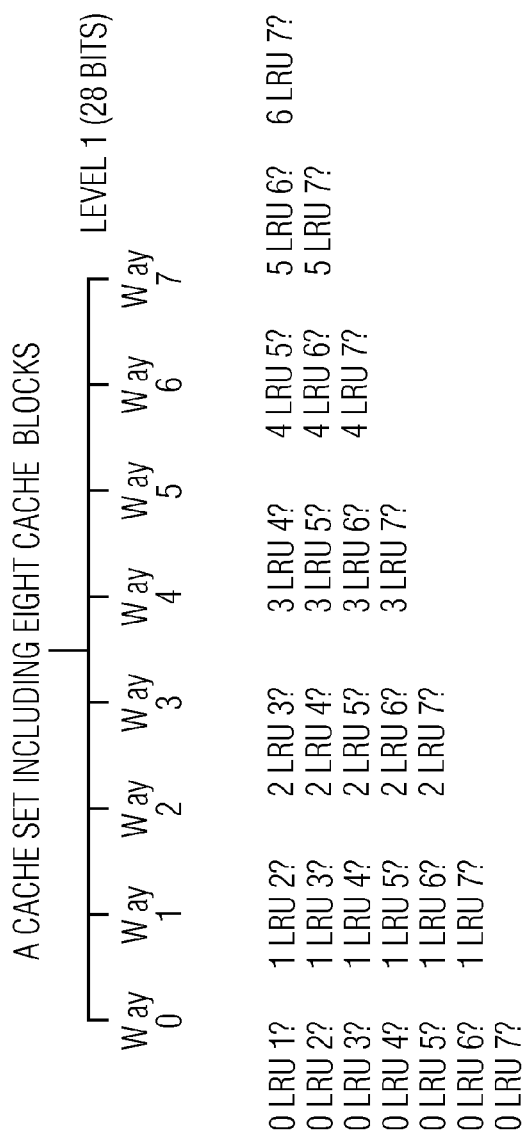
FIG. 4 depicts a full LRU cache replacement scheme for the cache of FIG. 2.

FIG. 4 depicts a full LRU cache replacement scheme for the 8-way associative cache 200 of FIG. 2. According to the full LRU cache replacement scheme, the time of last usage of a cache block in a cache set is compared with the time of last usage of another cache block in the cache set. As shown in FIG. 4, the time of last usage of cache block "0" is compared with the time of last usage of cache blocks "1," "2," "3," "4," "5," "6," and "7," respectively. The time of last usage of cache block "1" is compared with the time of last usage of cache blocks "2," "3," "4," "5," "6," and "7," respectively. The time of last usage of cache block "2" is compared with the time of last usage of cache blocks "3," "4," "5," "6," and "7," respectively. The time of last usage of cache block "3" is compared with the time of last usage of cache blocks "4," "5," "6," and "7," respectively. The time of last usage of cache block "4" is compared with the time of last usage of cache blocks "5," "6," and "7," respectively. The time of last usage of cache block "5" is compared with the time of last usage of cache blocks "6" and "7," respectively. The time of last usage of cache block "6" is compared with the time of last usage of cache block "7." A bit is used to store the result of each comparison and an implementation of the full LRU cache replacement scheme of FIG. 4 requires twenty-eight bits, which is more than two times the ten bits required by the cache management unit 108 in the example of FIG. 3.

An exemplary comparison between the full LRU cache replacement scheme of FIG. 4, a traditional two-level hierarchical LRU cache replacement scheme that indentifies the LRU cache block in a cache set without using cache block validity information, and the cache replacement scheme described with reference to FIG. 3 on the 8-way associative cache 200 of FIG. 2 is described with reference to FIGS. 5 and 6. In the exemplary comparison, only data in cache block "1" is no longer needed for processing. Because the data in cache block "1" is no longer needed for processing, the validity bit of cache block "1" is set to zero and cache block "1" is referred to as being invalid. Data in cache block "0" is used, and as a result, cache block "0" is made the MRU cache block in the cache set.

According to the traditional two-level hierarchical LRU cache replacement scheme, a two-level hierarchy of cache blocks is provided for a cache set of the 8-way associative cache. The eight cache blocks in a cache set are divided in the same fashion in the example of FIG. 3. An important difference between the traditional two-level hierarchical LRU cache replacement scheme and the cache replacement scheme described with reference to FIG. 3 is that the traditional two-level hierarchical LRU cache replacement scheme indentifies the LRU cache block in a cache set without using cache block validity information.

FIG. 5 illustrates an initial order of time in terms of usage of eight cache blocks in a cache set, with the initial order in time being represented by the full LRU cache replacement scheme of FIG. 4, the above-described traditional two-level hierarchical LRU cache replacement scheme, and the cache replacement scheme described with reference to FIG. 3. A syntax "A LRU B" indicates that object A is the LRU object of objects A and B.

As shown in FIG. 5, the time of last usage of cache block "7" is prior to the time of last usage of cache block "6," the time of last usage of cache block "6" is prior to the time of last usage of cache block "5," the time of last usage of cache block "5" is prior to the time of last usage of cache block "4," the time of last usage of cache block "4" is prior to the time of last usage of cache block "3," the time of last usage of cache block "3" is prior to the time of last usage of cache block "2," the time of last usage of cache block "2" is prior to the time of last usage of cache block "1," and the time of last usage of cache block "1" is prior to the time of last usage of cache block "0." That is, cache block "7" is initially the MRU cache block in the cache set and cache block "0" is initially the LRU cache block in the cache set.

The initial order in time in terms of usage of the eight cache blocks in the cache set can be perfectly represented by the full LRU cache replacement scheme of FIG. 4, the traditional two-level hierarchical LRU cache replacement scheme, and the cache replacement scheme described with reference to FIG. 3. For representing the original order in time, an implementation of the full LRU cache replacement scheme of FIG. 4 requires twenty-eight bits, as described with reference to FIG. 4. An implementation of the traditional hierarchical LRU replacement scheme and an implementation of the cache replacement scheme described with reference to FIG. 3 both require ten bits. However, the traditional two-level hierarchical LRU cache replacement scheme may mistakenly identify the LRU cache block in the cache set under an updated order of time.

When data in cache block "0" is used, cache block "0" becomes the MRU cache block in the cache set and cache block "1" becomes the LRU cache block in the cache set.

FIG. 6 illustrates an updated order of time in terms of usage of the eight cache blocks in the cache set, with the updated order in time being represented by the full LRU cache replacement scheme of FIG. 4, the traditional two-level hierarchical LRU cache replacement scheme, and the cache replacement scheme described with reference to FIG. 3.

As shown in FIG. 6, the full LRU cache replacement scheme of FIG. 4 represents the updated order in time perfectly. Specifically, the full LRU cache replacement scheme of FIG. 4 indentifies cache block "0" as the MRU cache block in the cache set and cache block "1" as the LRU cache block in the cache set. For representing the updated order in time, the full LRU cache replacement scheme of FIG. 4 requires twenty-eight bits.

The traditional two-level hierarchical LRU cache replacement scheme provides an imperfect order in time in terms of usage of cache blocks in a cache set. Because of the imperfect order in time in terms of usage of the cache blocks, a cache block that is not the LRU cache block in the cache set may be mistakenly identified as the LRU cache block in the cache set. As shown in FIG. 6, the cache block pair "{0, 1}" becomes the MRU cache block pair. Within the "{0, 1}" cache block pair, cache block "0" is made the MRU cache block and cache block "1" is made the LRU cache block. The cache block pair "{2, 3}" becomes the LRU cache block pair. Therefore, an implementation of the traditional two-level hierarchical LRU cache replacement scheme mistakenly identifies cache block "2" as the LRU cache block in the cache set.

As shown in FIG. 6, the cache replacement scheme described with reference to FIG. 3 makes cache block "0" the MRU cache block in the cache set. Because cache block "1" and cache block "0" are in the same pair of cache blocks "{0, 1}" and cache block "1" is invalid, the cache replacement scheme described with reference to FIG. 3 will update the second level of the cache blocks, but will not update the first level of the cache blocks. As a result, the cache replacement scheme described with reference to FIG. 3 still identifies the pair of cache blocks "{0, 1}" as the LRU pair of the four pairs of cache blocks. The cache replacement scheme described with reference to FIG. 3 identifies cache block "1" as the LRU cache block in the pair of cache blocks "{0, 1}." Therefore, the cache replacement scheme described with reference to FIG. 3 correctly identifies cache block "1" as the LRU cache block of the eight cache blocks in the cache set.

In the exemplary comparison, the cache replacement scheme described with reference to FIG. 3 and the full LRU cache replacement scheme of FIG. 4 can both correctly identify the LRU cache block in the cache set under the updated order of time. However, an implementation of the cache replacement scheme described with reference to FIG. 3 requires fewer bits, compared to an implementation of the full LRU cache replacement scheme of FIG. 4. The cache replacement scheme described with reference to FIG. 3 and the traditional two-level hierarchical LRU cache replacement scheme require the same amount of bits. However, the cache replacement scheme described with reference to FIG. 3 can correctly identify the LRU cache block in the cache set under the updated order of time and the traditional two-level hierarchical LRU cache replacement scheme cannot correctly identify the LRU cache block in the cache set under the updated order of time.

Figure 7:
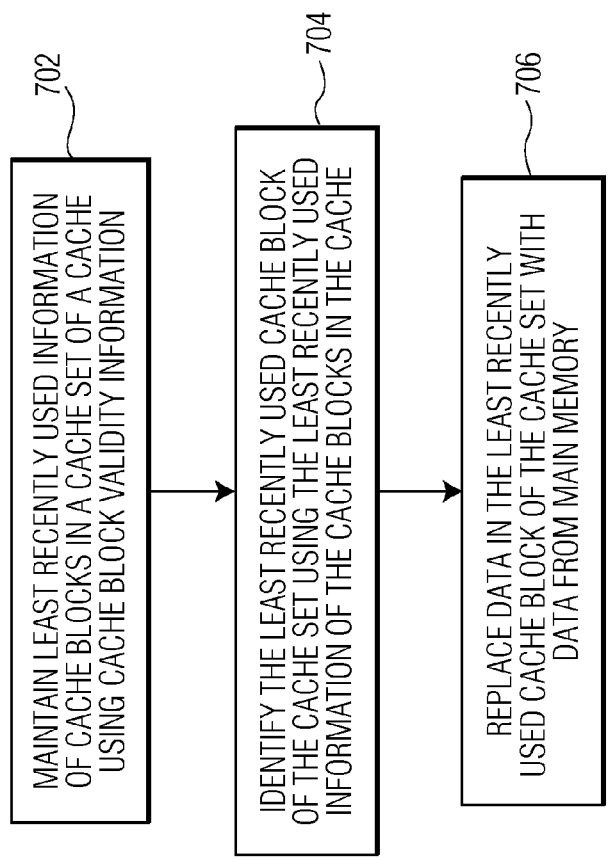
FIG. 7 is a process flow diagram of a method for replacing data in a cache in accordance with an embodiment of the invention. Throughout the description, similar reference numbers may be used to identify similar elements.

FIG. 7 is a process flow diagram of a method for replacing data in a cache in accordance with an embodiment of the invention. At block 702, least recently used information of cache blocks in a cache set of the cache is maintained using cache block validity information. At block 704, the least recently used cache block of the cache set is identified using the least recently used information of the cache blocks in the cache set. At block 706, data in the least recently used cache block of the cache set is replaced with data from main memory.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention that have been described or depicted include several components described or depicted herein, other embodiments of the invention may include fewer or more components to implement less or more functionality.

Although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for replacing data in a cache, the method comprising:
    maintaining least recently used information of a plurality of groups of cache blocks in a cache set of the cache, wherein each group comprises two or more cache blocks;
    maintaining least recently used information and validity information of each cache block within each group;
    identifying the least recently used cache block of the cache set using the validity information, the least recently used information of the plurality of groups, and the least recently used information of the cache blocks in each group; and
    replacing data in the least recently used cache block of the cache set with data from main memory.

2. The method of claim 1, wherein the validity information comprises information that indicates that data in a cache block is no longer needed for processing.

3. The method of claim 2 further comprising setting a validity bit of a cache block to a predetermined value if data in the cache block is no longer needed for processing.

4. The method of claim 2, wherein maintaining the least recently used information of a plurality of groups comprises keeping an order in time of the plurality of groups the same if the cache block validity information for a cache block within a group indicates that data in the cache block is no longer needed for processing.

5. The method of claim 2, wherein maintaining the least recently used information of a plurality of groups comprises updating an order in time in terms of usage of two groups when data in a cache block of the two groups is used for processing, if the cache block validity information indicates that data in all of the cache blocks in the two groups is needed for processing.

6. The method of claim 5, wherein maintaining the least recently used information of a plurality of groups further comprises updating an order in time in terms of usage of cache blocks in a group when data in one of the blocks in the group is used for processing.

7. The method of claim 5, wherein each group contains the same number of cache blocks.

8. The method of claim 1 further comprising copying the data in the least recently used cache block of the cache set to the main memory if the least recently used cache block of the cache set contains data that is not reflected in the main memory.

9. A video processing system, the video processing system comprising:
    main memory configured to store a data working set;
    a cache coupled to the main memory and configured to cache a subset of the data working set;
    a video processor coupled to the cache and configured to process the subset of the data working set; and a cache management unit configured to:
    maintain least recently used information of a plurality of groups of cache blocks in a cache set of the cache, wherein each group comprises two or more cache blocks;
    maintain least recently used information and validity information of each cache block within each group of cache blocks;
    identify the least recently used cache block of the cache set using the validity information, least recently used information of the plurality of groups of cache blocks, and the least recently used information of the cache blocks in each group; and
    replace data in the least recently used cache block of the cache set with data from the data working set stored at the main memory.

10. The video processing system of claim 9, wherein the validity information comprises information that indicates that data in a cache block is no longer needed by the video processor for video processing.

11. The video processing system of claim 10, wherein the cache management unit is further configured to set a validity bit of a cache block to a predetermined value if data in the cache block is no longer needed by the video processor for video processing.

12. The video processing system of claim 10, wherein the cache management unit is further configured to:
    keep an order in time in terms of usage of the plurality of groups the same if the cache block validity information for a cache block within a group indicates that data in the cache block is no longer needed for processing.

13. The video processing system of claim 10, wherein the cache management unit is further configured to:
update an order in time in terms of usage of two groups in the cache set when data in a cache block of the two groups is used by the video processor, if the cache block validity information indicates that data in all of the cache blocks in the two groups is needed by the video processor for video processing.

14. The video processing system of claim 13, wherein the cache management unit is further configured to update an order in time in terms of usage of cache blocks in a group when data in one of the blocks in the group is used by the video processor.

15. The video processing system of claim 13, wherein each group contains the same number of cache blocks.

16. The video processing system of claim 9, wherein the cache management unit is further configured to copy the data in the least recently used cache block of the cache set to the main memory if the least recently used cache block of the cache set contains data that is not reflected in the main memory.

17. A method for replacing data in a cache in a video processing system, the method comprising:
dividing cache blocks in a cache set into two hierarchical levels of cache blocks, wherein one level comprises a plurality of groups of cache blocks;
maintaining least recently used information of each group;
maintaining least recently used information and validity information of each cache block;
identifying the least recently used cache block of the cache set using the validity information, least recently used information of each group, and least recently used information of the cache blocks in each group; and
replacing data in the least recently used cache block of the cache set with data from main memory in the video processing system.

18. The method of claim 17, wherein the cache block validity information comprises information that indicates that data in a cache block is no longer needed by the video processing system for video processing.

19. The method of claim 18, wherein maintaining least recently used information of each group comprises keeping an order in time in terms of usage of two groups the same if the cache block validity information indicates that data in a cache block of the two groups is no longer needed for processing.

20. The method of claim 19, wherein maintaining least recently used information of each group comprises updating an order in time in terms of usage of two groups when data in one of the two groups is used by the video processing system if the cache block validity information indicates that data in all of the cache blocks in the two groups is needed by the video processing system.

* * * * *